United States Patent [19]

Kamoda et al.

[11] Patent Number: 5,682,565
[45] Date of Patent: Oct. 28, 1997

[54] FILM FEED DEVICE OF CAMERA

[75] Inventors: Takashi Kamoda, Omiya; Takashi Mashiko, Naka-gun, both of Japan

[73] Assignee: Fuji Photo Optical Co., Ltd., Saitama, Japan

[21] Appl. No.: 400,818

[22] Filed: Mar. 8, 1995

[30] Foreign Application Priority Data

Jun. 16, 1994 [JP] Japan .................. 6-134415

[51] Int. Cl.$^6$ .................................................. G03B 1/00
[52] U.S. Cl. .................................... 396/411; 396/413
[58] Field of Search ........................ 354/212–214, 354/171, 173.1; 396/396, 405, 410, 411, 413

[56] References Cited

U.S. PATENT DOCUMENTS 4,610,522 9/1986 Tobioka et al. .................. 396/413
4,688,763 8/1987 Wakabayashi et al. ............ 396/410
4,987,436 1/1991 Misawa ............................. 396/440

Primary Examiner—D. Rutledge
Attorney, Agent, or Firm—Oliff & Berridge

[57] ABSTRACT

A feeding tooth of a one-tooth sprocket retracts from a film so that the film can be prevented from being damaged by the feeding tooth of the one-tooth sprocket when the film is rewound. When a motor rotates in a film winding direction, a rewinding fork becomes free and a spool and the one-tooth sprocket rotates in a winding direction. As a result, the feeding tooth of the one-tooth sprocket engages with a perforation of the film to feed the end of the film up to the spool. On the other hand, when the motor rotates in the film rewinding direction, the one-tooth sprocket becomes free and the spool and the rewinding fork rotate in the rewinding direction. As a result, the film is wound around a rotation axis of a patrone. In this case, the feeding tooth of the one-tooth sprocket retracts from the film.

8 Claims, 5 Drawing Sheets

FILM FEED DEVICE OF CAMERA

BACKGROUND OF THE INVENTION

1. Field of the Invention

This invention relates to a film feed device of a camera and more particularly to a film feed device of a camera which initially feeds the forward end of the film up to a winding spool by means of a sprocket for initial feeding.

2. Description of the Related Art

A one-tooth sprocket or a two-teeth sprocket is known to initially feed a film in a patrone stored in a camera up to a spool. That is, a feeding tooth is provided at the one-tooth sprocket, and the one-tooth sprocket rotates in the initial direction while the feeding tooth is engaged with the perforation so as to initially feed the forward end of the film up to the spool. Since the spool rotates in the winding direction in this case, the perforation at the forward end of the film is engaged with a pawl of the spool and the film is wound around the spool. A gear is provided on the same axis as the one-tooth sprocket and integrated with the sprocket, and the gear of the one-tooth sprocket is connected with the spool gear via idle gears. The spool gear is connected with a driving gear of a motor in a state that the rotational force can be transmitted from the driving gear to the spool gear, and when the motor rotates in the film winding direction, the one-tooth sprocket rotates in the initial feeding direction so as to initially feed the forward end of the film up to the spool.

SUMMARY OF THE INVENTION

However, because the gear of the one-tooth sprocket is normally engaged with the idle gear and the driving gear of the motor via the spool gear and the idle gear, when the film is rewound into the patrone by means of the motor, the one-tooth sprocket rotates in the direction opposite to the initial feeding direction (in short, the film rewinding direction). Therefore, in the case that the one tooth of the one-tooth sprocket does not engage with the perforation of the film being rewound, there is a problem in that the tooth breaks the film by making a hole in the film.

The present invention has been developed under the above-described circumstances, and has as its aim the provision of a film feed device of a camera which prevents the film from being damaged while the film is rewound.

To achieve the above-described object, the present invention comprises a motor for winding and rewinding a film, a spool connected with the motor via a gear train for winding the film, changeover means which is connected with the motor via the gear train, and which is changed to a film winding position or a film rewinding position when the motor rotates in the film winding direction or in the film rewinding direction, a sprocket which is connected with the motor and initially feeds a forward end of the film up to the spool when the changeover means is changed to the film winding position, and a fork which is connected with said motor and rewinds a film around a patrone axis when the changeover means is changed to the film rewinding position.

According to the present invention, the planet gear is connected with the motor in a state that the rotational force can be transmitted from the motor. The movement means moves the planet gear up to the position where the rotational force of the motor is transmitted to the sprocket, when the motor rotates in the film winding direction. And, the movement means moves the planet gear up to the position where the rotational force of the motor is transmitted to the rewinding fork, when the motor rotates in the film rewinding direction.

Therefore, when the motor rotates in the film winding direction, the rewinding fork becomes free and the spool and the sprocket rotate in the winding direction. As a result, the feeding tooth of the sprocket engages with the perforation of the film so as to feed the forward end of the film up to the spool. And, the perforation at the forward end of the film, which has been fed to the spool, is engaged with the pawl of the rotating spool.

On the other hand, when the motor rotates in the film rewinding direction, the sprocket is set free and the spool and the rewinding fork rotate in the rewinding direction. As a result, the film is wound around the patrone axis. Since the sprocket is free in this case, the feeding tooth retracts from the film.

Furthermore, the circumferential speed of the spool is higher than that of the patrone axis, which is engaged with the rewinding fork, the perforation of the film, which is engaged with the pawl of the spool, easily separates from the pawl. Therefore, if the circumferential speed of the spool is set higher than that of the patrone axis, the spool is in the same situation as when it is mechanically free.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 4 is a sectional view along a line B-B of FIG. 3; and.

DESCRIPTION OF THE PREFERRED EMBODIMENT

Detailed description will hereunder be given of the preferred embodiment of a film feed device of a camera according to the present invention with reference to the accompanying drawings.

Figure 1:
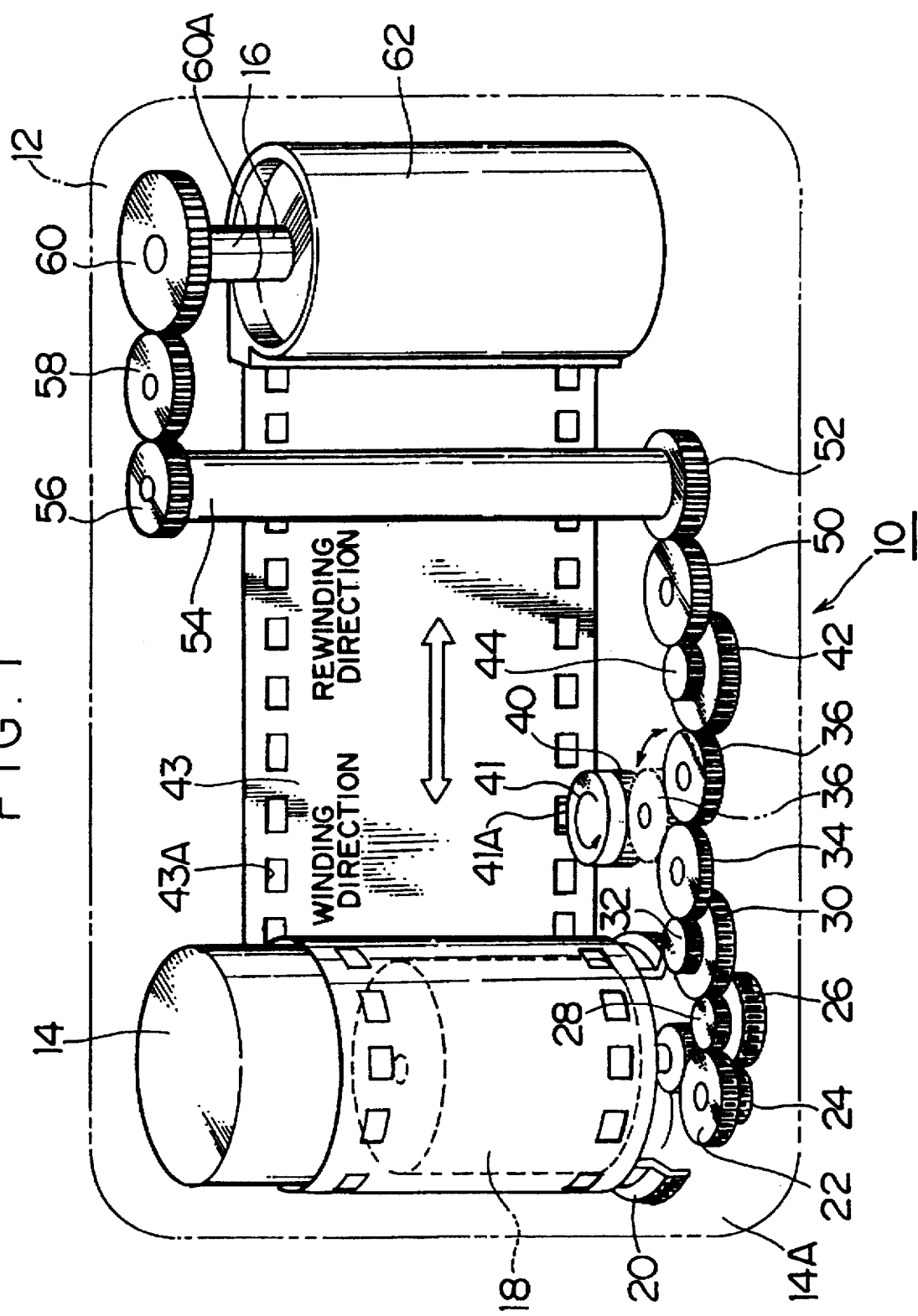
FIG. 1 is a perspective view illustrating the structure of a film feed device of the camera according to the present invention.
Figure 2:
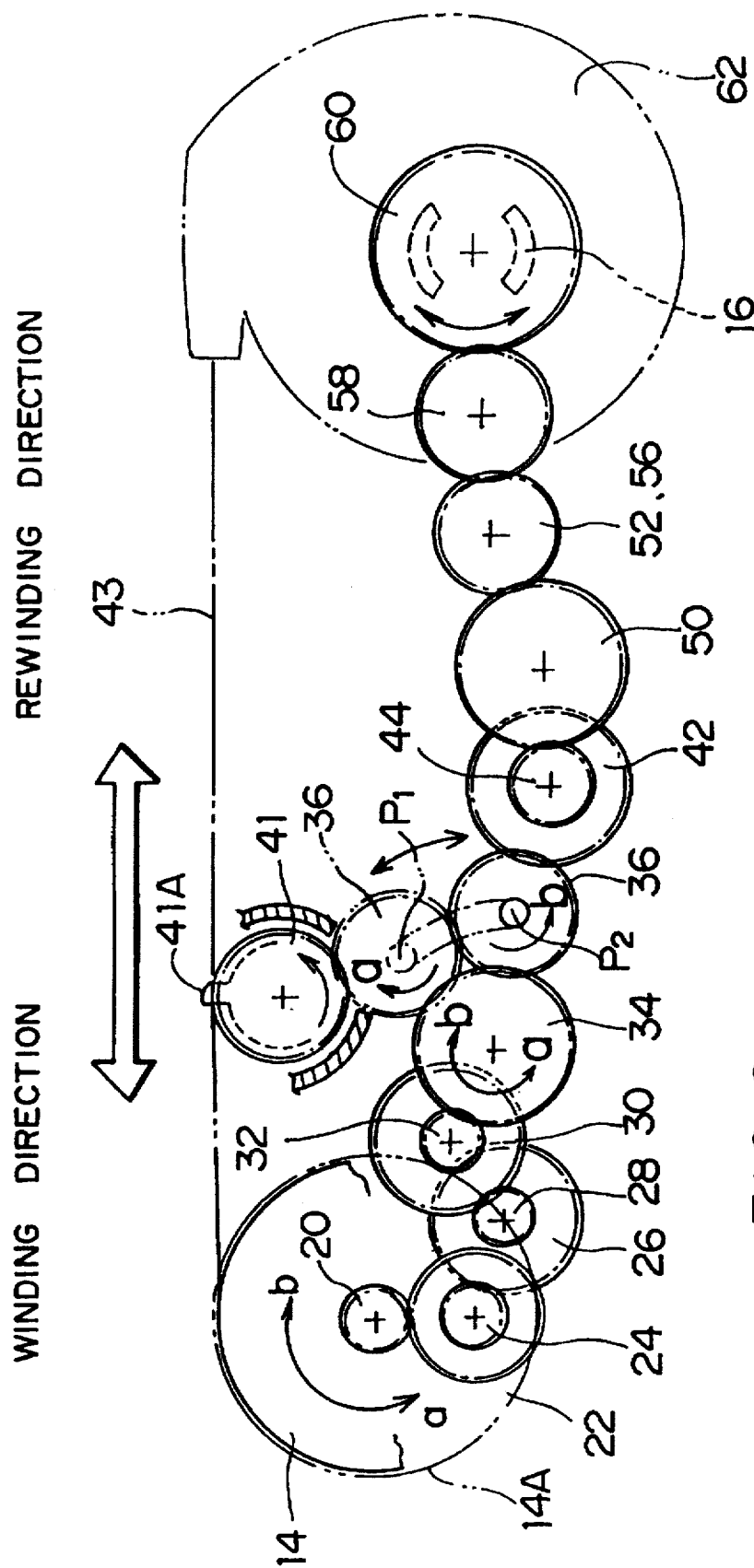
FIG. 2 is an explanatory view explaining the operation of the film feed device of the camera according to the present invention.

A detailed description will be given of the film feed device of the camera according to the present invention with reference to the drawings. FIG. 1 is a perspective view illustrating the structure of the film feed device of the camera according to the present invention, and FIG. 2 is an explanatory view explaining the operation of it. As shown in FIG. 1, in the film feed device of the camera 10, a spool 14 and a patrone axis 16 are rotatably supported at both sides of a camera case 12. The spool 14 has a cylindrical shape, and a motor 18 is stored on the same rotation axis as the spool 14. A driving gear 20 is fixed on the driving axis of the motor 18, and is also located at the bottom part of the camera case 1 as shown in FIG. 1.

The driving gear 20 is engaged with a gear 22, and a gear 24 is provided on the same axis as the gear 22. A gear 30 is engaged with a gear 28, and a gear 32 is provided on the same axis as the gear 30. A spool gear 14A is engaged with the gear 32, and a sun gear 34 is engaged with the gear 32.

Figure 3:
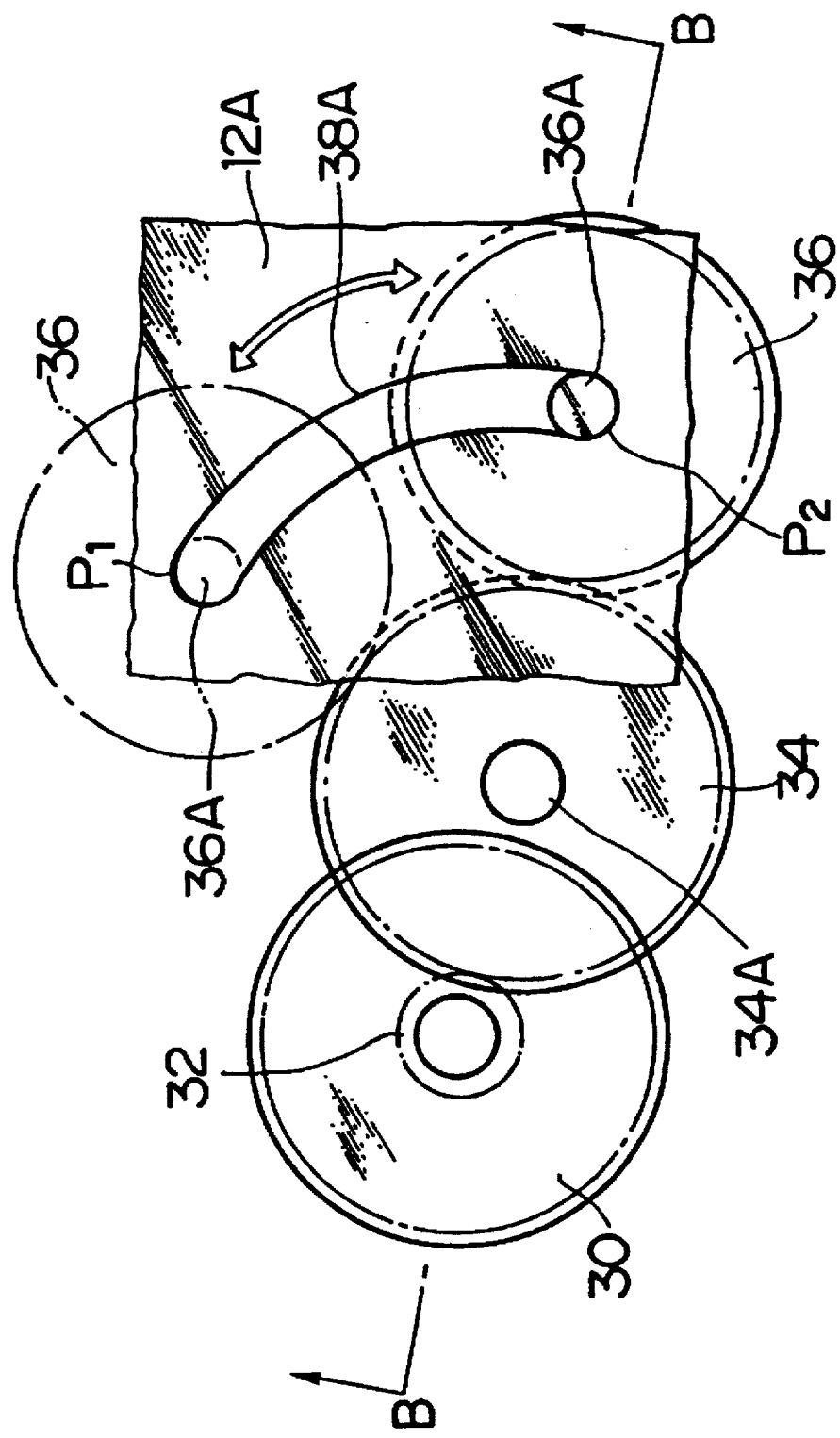
FIG. 3 is an enlarged view illustrating essential portions of the film feeding device of the camera according to the present invention.

A planet gear 36 is engaged with the sun gear 34, and an axis 36A of the planet gear 36 is movably supported along arched grooves (movement means) 38A and 38B as shown in FIG. 3. The guide means, arched grooves 38A and 38B, have an arc shape, whose center is an axis 34A of a sun gear 34. Arched grooves 38A and 38B are respectively arranged at the top part 12A of the camera case 12.

Figure 4:
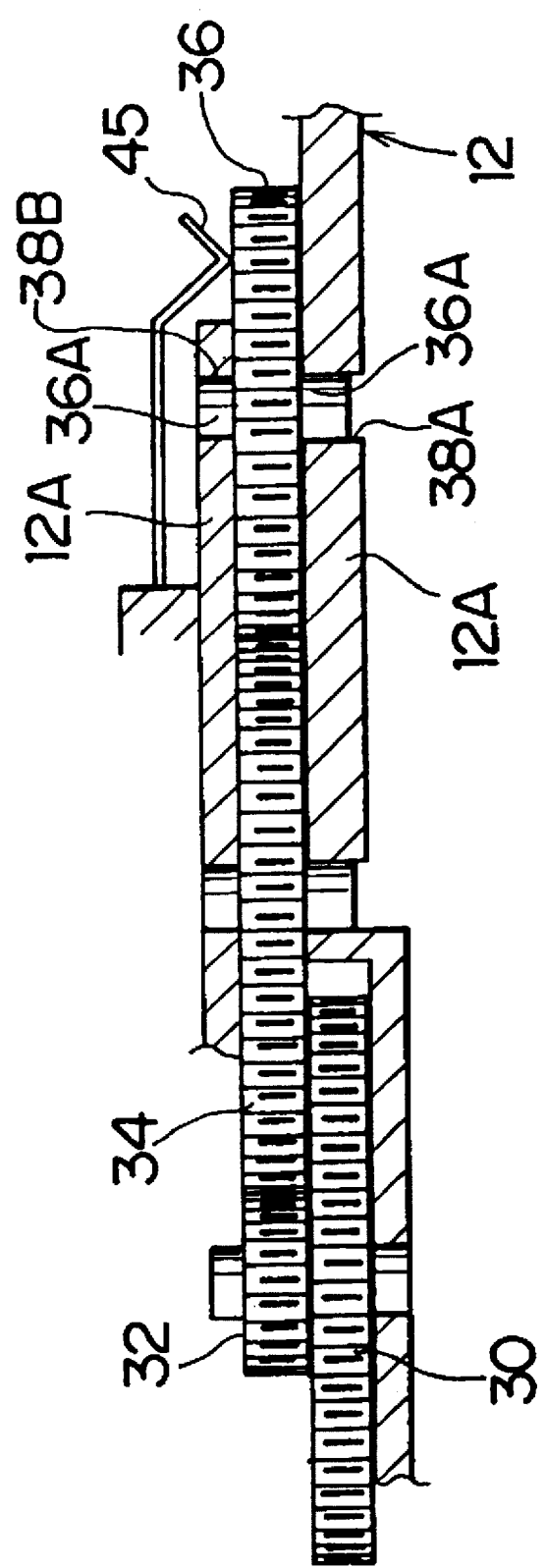

Furthermore, as shown in FIG. 4, a plate spring 45 contacts the top part of the planet gear 36, so, the bottom part of the planet gear 36 is pressed against the bottom part 12A of the camera case 12 so that the frictional force can be generated between the case 12 and the planet gear 36. Therefore, when the driving gear 20 rotates in the film winding direction (the direction of an arrow a), the sun gear 34 rotates in the direction of the arrow a and the axis 36A of the planet gear 36 moves to an initial feeding position $P_1$. And, when the driving gear 20 rotates in the film rewinding direction (the direction of an arrow b), the sun gear 34 rotates in the direction of the arrow b and the axis 36A of the planet gear 36 moves to a rewinding position $P_2$.

When the axis 36A of the planet gear 36 is located at the initial feeding position $P_1$ of arched grooves 38A and 38B, the planet gear 36 engages with a one-tooth sprocket gear 40. A one-tooth sprocket 41 is formed at the bottom part of the one-tooth sprocket gear 40 in FIG. 1, and a feeding tooth 41A is formed at the one-tooth sprocket 41 in a state that the feeding tooth 41A engages with a perforation 43A of a film 43. And, when the axis 36A of the planet gear 36 is located at the initial feeding position Pof the arched grooves 38A and 38B, the planet gear 36 rotates in the direction of the arrow a, so that the one-tooth sprocket 41 rotates in the film winding direction (the direction of the arrow a).

Moreover, the axis 36A of the planet gear 36 is located at the rewinding position $P_2$ of the arched grooves 38A and 38B, the planet gear 36 engages with the gear 42. A gear 44 is provided on the same axis as the gear 42 and integrated with the gear 42, and the gear 44 engages with a gear 52 via a gear 50. The gear 52 is provided at the bottom part of an axis 54, and a gear 56 is arranged at the top part of the axis 54. The gear 56 engages with a rewinding fork gear 60 via a gear 58, and a rewinding fork 60A at the bottom part of the rewinding fork gear 60 engages with the rotation axis 16 of the patrone 62. And, when the axis 36A of the planet gear 36 is located at the rewinding position $P_2$ of the arched grooves 38A and 38B, the planet gear 36 rotates in the direction of the arrow b, so that the rewinding fork gear 60A rotates in the film rewinding direction (direction of the arrow b).

An explanation will be given of the operation of the film feed device according to the present invention structured as described above. First, an explanation will be given of the case in that the film 43 is fed initially. When the driving gear 20 of the motor 18 rotates in the direction of the arrow a, the sun gear 34 rotates in the direction of the arrow a via the gears 22, 24, 26, 28, 30, and 32. When the sun gear 34 rotates in the direction of the arrow a, the axis 36A of the planet gear 36 moves to the initial feeding position $P_1$ and the planet gear 36 engages with the gear 40. In this case, the connection between the driving gear 20 and the rewinding fork gear 60 is released, and the rotation axis 16 of the patrone 62 becomes free.

And, when the planet gear 36 rotates in the direction of the arrow a, the one-tooth sprocket gear 40 rotates in the film winding direction (the direction of the arrow a). When the one-tooth sprocket gear 40 rotates in the film winding direction, the feeding tooth 41A is engaged with the perforation 43A of the film 43. As a result, the forward end of the film 43 is initially fed up to the spool 14. In this case, the rotational force is transmitted to a spool gear 14A of the spool 14, so the spool 14 rotates in the direction of the arrow a. Therefore, the perforation 43A at the forward end of the film, which has been fed initially, engages with a pawl of the spool 14, and the film 43 is wound around the spool 14.

Next, an explanation will be given of the case that the film 43 is wound. When the driving gear 20 of the motor 18 rotates in the direction of the arrow a, the spool gear 14A rotates in the direction of the arrow a via the gears 22, 24, 26, 28, 30, and 32. In this case, the rotation axis 16 of the patrone 62 is free, so the film 43 is pulled out of the patrone 62 and is wound around the spool 14.

Next, an explanation will be given of the case that the film 43 is rewound. When the driving gear 20 of the motor 18 rotates in the direction of the arrow b, the spool 14 rotates in the direction of the arrow b via the gears 24, 26, 28, 30, 32, and the spool gear 14A. And, the gear 34 turns in the direction of the arrow b. When the sun gear 34 rotates in the direction of the arrow b, the axis 36A of the planet gear 36 moves from the initial feeding position $P_1$ to the rewinding position $P_2$.

Therefore, the engagement of the planet gear 36 and the one-tooth sprocket gear 40 is released, and the planet gear 36 is engaged with the gear 42. As a result, the rotational force of the planet gear 36 is transmitted to the rewinding fork gear 60 via the gears 42, 44, 50, 52, 56, and 58. The rotational force, which has been transmitted to the rewinding fork gear 60, is transmitted to the rotation axis 16 of the patrone 62 via the rewinding fork 60A, and the rotation axis 16 of the patrone 62 turns in the direction of the arrow b, and the film 42 is rewound around the rotation axis 16 of the patrone 62.

Figure 5:
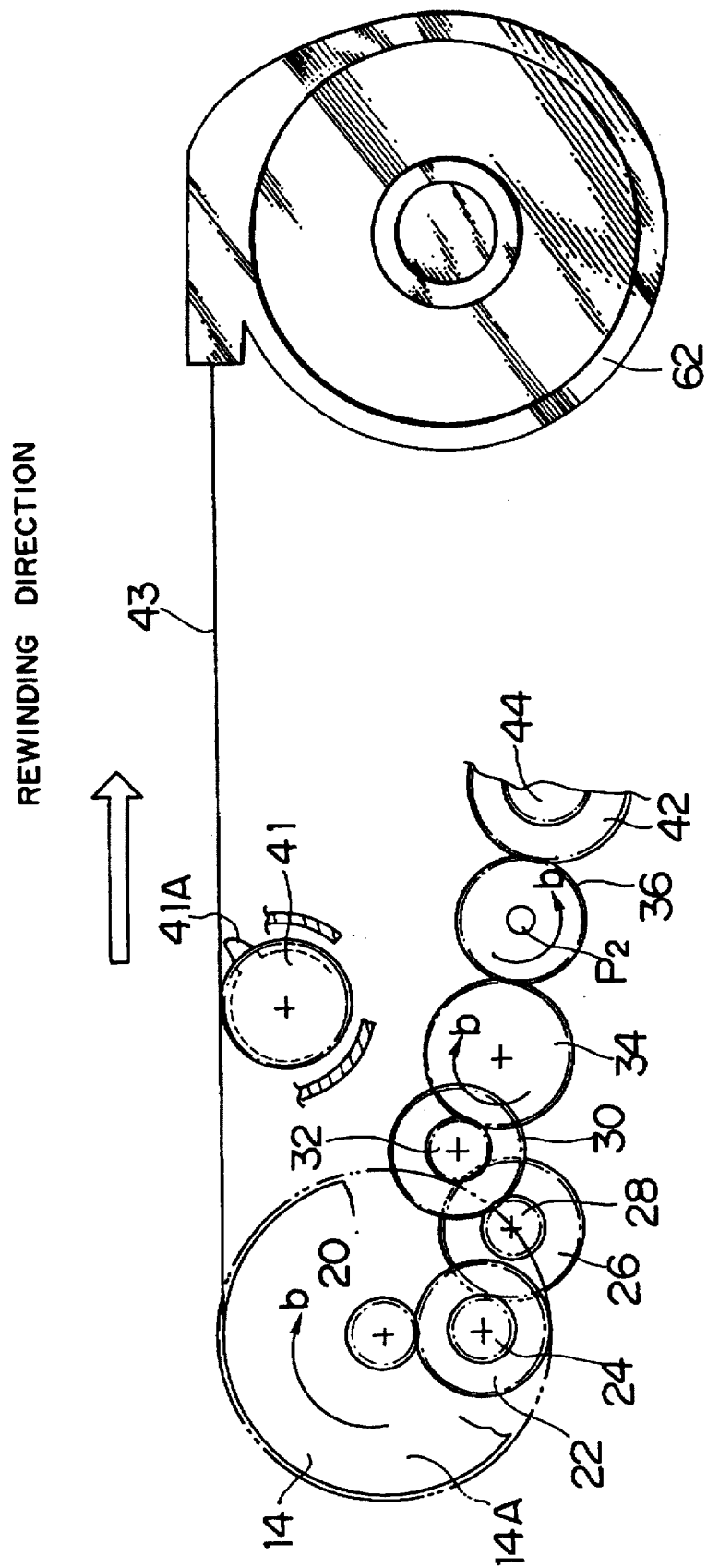
FIG. 5 is an explanatory view explaining the rewinding operation of the film feed device of the camera according to the present invention.

Because the one-tooth sprocket 41 becomes free in this case, the feeding tooth 41A of the one-tooth sprocket 41 is pushed by the film 43 to separate from the film 43 as shown in FIG. 5. Therefore, such a problem is avoided that the film 43 is damaged and the perforation 43A of the film 43 is broken while the film 43 is being rewound. And, since the circumferential speed of the spool 14 during the rewinding of the film 43 is set higher than that of the rotation axis 16 of the patrone 62, the perforation 43A of the film 43 separates from the pawl of the spool 14. In this case, if the rotation axis 16 of the patrone is the maximum diameter (the state that the film has been wound) and the spool is the minimum diameter (the state that the film has not been wound yet), the ratio of the circumferential speed of the patrone's rotation axis 16 and that of the spool 14 is as follows:

the speed of the patrone's rotation axis: the spool=1:1.04 This ratio can be adjusted by changing the diameter of the spool 14, the gear ratio or the like. Thus, if the circumferential speed of the spool 14 is set higher than that of the rotation axis 16 of the patrone, the same effect can be obtained as when the spool 14 is free. The conventional camera is provided means for setting the spool 14 mechanically free, but according to the film feed device of the camera of the present invention, only if the circumferential speed of the spool 14 is set higher than that of the rotation axis 15 of the patrone, the spool 14 is in the same situation as when it is mechanically free, so that the number of parts can be reduced.

In the above-described embodiment, the explanation was given of the case that the planet gear 36 moves between the initial feeding position $P_1$ and the rewinding position $P_2$ along the arched grooves 38A and 38B, but the planet gear 36 may move between the initial feeding position $P_1$ between the rewinding position $P_2$ by means of an arm instead of the arched grooves 38A and 38B.

As described above, according to the film feeding device of the camera of the present invention, when the motor rotates in the film winding direction, the rewinding fork is set free and the spool and the sprocket rotates in the winding direction. As a result, the feeding tooth of the sprocket engages with the perforation of the film to feed the forward end of the film up to the spool. And, the perforation at the forward end of the film, which has been fed to the spool, is engaged with the pawl of the rotating spool.

On the other hand, when the motor rotates in the film rewinding direction, the sprocket is set free and the spool and the rewinding fork rotates in the rewinding direction. As a result, the film is wound around the axis of the patrone. Because the sprocket is free in this case, the feeding tooth of the sprocket retracts from the film. Therefore, it is possible to prevent the film from being broken by the feeding tooth of the sprocket while the film is rewound.

Moreover, the circumferential speed of the spool during the rewinding of the film is higher than that of the patrone axis engaged with the rewinding fork, so the perforation of the film, which is engaged with the pawl of the spool, easily separates from the pawl. Therefore, when the circumferential speed of the spool is set higher than that of the patrone axis, the spool is in the same situation as when it is mechanically free.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film feed device of a camera, comprising:

a motor for winding and rewinding a film;

a spool connected with said motor via a gear train for winding the film;

changeover means connected with said motor via said gear train, said changeover means being changed to a film winding position when said motor rotates in a film winding direction and being changed to a film rewinding position when said motor rotates in a film rewinding direction, said changeover means is provided with a planet gear which is connected with the motor via said gear train and a guide means which movably supports the planet gear;

a sprocket which is connected with said motor and initially feeds a forward end of the film up to said spool when said changeover means is changed to the film winding position; and a rewinding fork which is connected with said motor and rewindings the film around a patrone axis when said changeover means is changed to the film rewinding position, said spool having a diameter sized so that a rotational speed of said spool can be higher than that of said patrone axis whereby, when said motor rotates in the film winding direction, said planet gear moves in a first direction within said guide means to connect with said sprocket and, when said motor rotates in the film rewinding direction, said planet gear moves in a second direction within said guide means to connect with the gear train connected with said rewinding fork.

2. The film feed device of the camera as set forth in claim 1, wherein said guide means is an arched groove.

3. The film feed device of the camera as set forth in claim 2, wherein said planet gear is pressed against a camera case by a force of an elastic means.

4. A film feed device of a camera, comprising:

a motor for winding and rewinding a film;

a spool connected with said motor via a gear train for winding the film;

changeover means connected with said motor via said gear train, said changeover means being changed to a film winding position when said motor rotates in a film winding direction and being changed to a film rewinding position when said motor rotates in a film rewinding direction, said changeover means being provided with a planet gear which is connected with the motor via said gear train and a guide means which movably supports the planet gear;

a sprocket which is connected with said motor and initially feeds a forward end of the film up to said spool when said changeover means is changed to the film winding position; and a rewinding fork which is connected with said motor and rewinds the film around a patrone axis when said changeover means is changed to the film rewinding position whereby, when said motor rotates in the film winding direction, said planet gear moves in a first direction within said guide means to connect with said sprocket and, when said motor rotates in the film rewinding direction, said planet gear moves in a second direction within said guide means to connect with the gear train connected with said rewinding fork.

5. The film feed device of the camera as set forth in claim 4, wherein said guide means is an arched groove.

6. The film feed device of the camera as set forth in claim 5, wherein said planet gear is pressed against a camera case by a force of an elastic means.

7. The film feed device of the camera as set forth in claim 4, wherein a diameter of said spool is sized so that a rotational speed of said spool can be higher than that of said patrone axis.

8. A film feed device of a camera, comprising:

a motor for winding and rewinding a film;

a spool connected with said motor via a gear train for winding the film;

changeover means connected with said motor via said gear train, said changeover means being changed to a film winding position when said motor rotates in a film winding direction and being changed to a film rewinding position when said motor rotates in a film rewinding direction, said changeover means being provided with a planet gear which is connected with the motor via said gear train and a guide means in a form of an arched groove which movably supports the planet gear whereby, when said motor rotates in the film winding direction, said planet gear moves in a first direction within said guide means to connect with said sprocket and, when said motor rotates in the film rewinding direction, said planet gear moves in a second direction within said guide means to connect with the gear train connected with said rewinding fork;

a sprocket which is connected with said motor and initially feeds a forward end of the film up to said spool when said changeover means is changed to the film winding position; and a rewinding fork which is connected with said motor and rewinds the film around a patrone axis when said changeover means is changed to the film rewinding position.

* * * * *